United States Patent
Tun et al.

(10) Patent No.: US 12,146,051 B2
(45) Date of Patent: Nov. 19, 2024

(54) EPOXY RESIN COMPOSITIONS, PREPREG, AND FIBER-REINFORCED COMPOSITE MATERIALS

(71) Applicant: Toray Industries, Inc., Tokyo (JP)

(72) Inventors: Swezin Than Tun, Tacoma, WA (US); Jonathan Hughes, Tacoma, WA (US); Nobuyuki Arai, Tacoma, WA (US)

(73) Assignee: Toray Industries, Inc., Tokyo (JP)

(*) Notice: Subject to any disclaimer, the term of this patent is extended or adjusted under 35 U.S.C. 154(b) by 420 days.

(21) Appl. No.: 17/276,659

(22) PCT Filed: Sep. 20, 2019

(86) PCT No.: PCT/IB2019/001057
§ 371 (c)(1),
(2) Date: Mar. 16, 2021

(87) PCT Pub. No.: WO2020/058766
PCT Pub. Date: Mar. 26, 2020

(65) Prior Publication Data
US 2022/0033640 A1 Feb. 3, 2022

Related U.S. Application Data

(60) Provisional application No. 62/897,701, filed on Sep. 9, 2019, provisional application No. 62/734,623, filed on Sep. 21, 2018.

(51) Int. Cl.
| | | |
|---|---|---|
| C08L 63/00 | (2006.01) | |
| C08G 59/24 | (2006.01) | |
| C08G 59/32 | (2006.01) | |
| C08G 59/50 | (2006.01) | |
| C08J 5/04 | (2006.01) | |
| C08J 5/24 | (2006.01) | |
| C08L 81/06 | (2006.01) | |

(52) U.S. Cl.
CPC ............ C08L 63/00 (2013.01); C08G 59/245 (2013.01); C08G 59/32 (2013.01); C08G 59/504 (2013.01); C08J 5/042 (2013.01); C08J 5/24 (2013.01); C08J 5/243 (2021.05); C08L 81/06 (2013.01); *C08L 2201/08* (2013.01); *C08L 2205/025* (2013.01); *C08L 2205/035* (2013.01)

(58) Field of Classification Search
CPC ...... C08L 63/00; C08L 81/06; C08L 2201/08; C08L 2205/025; C08L 2205/035; C08J 5/243; C08J 5/042; C08J 5/24; C08G 59/245; C08G 59/32; C08G 59/504

USPC ......................................................... 523/403
See application file for complete search history.

(56) References Cited

U.S. PATENT DOCUMENTS

| | | |
|---|---|---|
| 10,851,217 B2 | 12/2020 | Aoki et al. |
| 2011/0049426 A1 | 3/2011 | Patel et al. |
| 2018/0134837 A1 | 5/2018 | Furukawa et al. |

FOREIGN PATENT DOCUMENTS

| | | | | |
|---|---|---|---|---|
| JP | 01104624 A | | 4/1989 | |
| JP | 2005248118 A | * | 9/2005 | ............ C08G 59/20 |
| JP | 2010202727 A | | 9/2010 | |
| WO | 2016204173 A1 | | 12/2016 | |
| WO | 2017033056 A1 | | 3/2017 | |
| WO | 2017038880 A1 | | 3/2017 | |
| WO | 2018073652 A1 | | 4/2018 | |

OTHER PUBLICATIONS

Arai et al., JP 2005-248118 A machine translation in English, Sep. 15, 2005. (Year: 2005).*
Polymer Industry Media International, https://pimi.ir/new-epiclon-hp-4770-epoxy-resin-increases-high-temperature-performance/epiclon-hp-4770-formula/, accessed Mar. 15, 2024. (Year: 2024).*
Huntsman Corporation, "Advanced Materials High Performance Components", 2010. (Year: 2010).*
International Search Report and Written Opinion for International Application No. PCT/IB2019/001057, dated Jan. 28, 2020, 7 pages.
International Preliminary Report on Patentability and Written Opinion for International Application No. PCT/IB2019/001057, issued Mar. 23, 2021, 6 pages.

* cited by examiner

*Primary Examiner* — David T Karst
(74) *Attorney, Agent, or Firm* — Buchanan Ingersoll & Rooney PC

(57) ABSTRACT

An epoxy resin composition is provided which includes a poly-naphthalene-based epoxy resin having two or more epoxy groups per molecule combined with a non-linear multi-phenyl epoxy resin and an additional epoxy resin having an epoxy functionality of 3 or more, as well as a prepreg, and a fiber-reinforced composite material prepared using the epoxy resin composition. More specifically, an epoxy resin composition is provided which contains a combination of particular types of epoxy resins and curatives that, when cured, provides high flexural modulus and that is suitable for preparing a fiber-reinforced composite material capable of withstanding extreme use environments such as low-temperature environments and high-temperature moisture-absorbing environments. In addition, epoxy resin systems are provided which are capable of achieving a high Tg along with good thermal stability for long periods of time at elevated temperatures (e.g., 180° C. or more) when cured at 210° C. for 2 hours.

23 Claims, No Drawings

EPOXY RESIN COMPOSITIONS, PREPREG, AND FIBER-REINFORCED COMPOSITE MATERIALS

CROSS-REFERENCE TO RELATED APPLICATIONS

This is the U.S. National Phase application of PCT/IB2019/001057, filed Sep. 20, 2019, which claims priority to U.S. Provisional Application No. 62/734,623, filed Sep. 21, 2018, and to U.S. Provisional Application No. 62/897,701, filed Sep. 9, 2019, the disclosures of each of these applications being incorporated herein by reference in their entireties for all purposes.

FIELD OF THE INVENTION

The present application provides an epoxy resin composition for fiber-reinforced composite materials that are well-suited for aerospace applications, sports applications, and general industrial applications.

BACKGROUND OF THE INVENTION

Fiber-reinforced Composite (FRC) materials comprising a reinforced fiber and a matrix resin have excellent mechanical properties such as strength and rigidity while being lightweight, and therefore are widely used as aircraft members, spacecraft members, automobile members, railway car members, ship members, sports apparatus members, and computer members such as housings for laptops. The FRC materials are produced by various methods; a widely practiced method is to use reinforcing fibers impregnated with an unhardened matrix resin, as a prepreg. In this method, sheets of prepreg are laminated and heated, to form a composite material. The matrix resins used for prepregs include both thermoplastic resins and thermosetting resins, in most cases; thermosetting resins are excellent in handling. Amongst these, epoxy resins, which provide outstanding characteristics such as high heat resistance, high elastic modulus, low shrinkage on curing and high chemical resistance, are most often employed.

The FRCs' properties depend on both the reinforcement fibers and the matrix resin. The important design properties include tensile strength and modulus, compression strength and modulus, impact resistance, damage tolerance, and toughness. In general, in FRC materials the reinforcing fibers contribute the majority of the properties. On the other hand, the matrix resin has greatest impact on compression strength and transverse tensile properties. When the FRC materials are used as structural materials, compression strength is an especially important property.

As the resin composition used in the prepreg, epoxy resins have been widely used as thermosetting resins to provide excellent handling properties and, when cured, excellent mechanical properties and heat resistance. Recently, applications for use as a structure for aircraft, automobile, general aviation, and industrial usage the mechanical properties required toward weight reduction are increasing, taking advantage of the mechanical properties of cured epoxy resin compositions to achieve weight reduction in such applications. Further strengthening of the tensile strength and compressive strength are important properties; maintaining high properties under high humidity, high temperature environments has become increasingly important especially in the aerospace and rocket industries. In order to improve the tensile strength of the composite material, in addition to improving the tensile strength of carbon fibers as a base material, it is also effective to lower the crosslink density of the cured product of the epoxy resin composition (which may be abbreviated as "cured product"). However, the heat resistance is lowered when lowering the crosslinking density. On the other hand, it is effective to improve the high elastic modulus of the cured product to increase the compressive strength of the composite material. However, in order to improve the elastic modulus of the cured product, it is effective to improve the crosslinking density. Therefore, the improvement of both the tensile strength and compressive strength of the composite material continues to be a very difficult task. To enhance the compression strength of the FRC materials, it is essential to enhance the flexural modulus of the cured product as much as possible.

To achieve both high tensile strength and high compressive strength in the composite material, while maintaining a low crosslinking density of the cured product by introducing a site of interaction between the molecular chains, it is considered effective to suppress the movement of the molecular chain. A method for suppressing the motion of the molecular chains in the cured product, without increasing the crosslink density by increasing the functionality of the resin, would be to introduce a molecular structure that creates an interaction with the bending structure of the molecular chain, thus stiffening the structure without increasing the crosslink density. Furthermore, in order to maintain mechanical properties under high humidity and high temperature environments, it is effective to reduce the free space in the polymer chain to reduce the water absorption in the cured product.

It has been found that to increase the wet thermal resistance above 190° C., one can use multi-phenyl group epoxy resins with epoxy functionalities above 3 (i.e., multi-phenyl epoxy resins having more than three epoxy groups per molecule) to improve the wet Tg. However, the use of this type of epoxy resin reduces the ETW (elevated temperature wet) flexural modulus of the cured product, thereby reducing the compression strength. Furthermore, these epoxy resins have a tendency to crystallize, thereby reducing the handleability of the epoxy resin.

Other forms of increasing the modulus of the cured product are to add a naphthalene structure or more preferably a bi-naphthalene structure. This works well to increase the modulus by introducing a stiff structure to the cured product. This cured product however, does not have high wet heat resistance.

Other systems have shown the effect of increasing both the heat resistance and modulus of the cured product using anhydride curing agents. While anhydride curing agents offer many benefits when compared to amine cured epoxies there are some drawbacks. In the uncured state, anhydrides will react with water limiting their use for long term storage of the product. Another down side is that they can degrade in the presence of water and high temperature making them unsuitable for aerospace use.

Therefore, the present invention seeks to provide an epoxy resin composition that can simultaneously achieve a high wet heat resistance, tensile strength, and elevated temperature wet compression strength while still providing good mold-ability and handle-ability.

The present inventors have intensively studied the above problems and have discovered that they can be solved by using, as an epoxy resin composition, a combination or mixture of specific components in particular relative amounts.

SUMMARY OF THE INVENTION

In one aspect of the invention, an epoxy resin composition for a fiber-reinforced composite material is provided, comprising components (A), (B), (C), and (D), wherein the epoxy resin composition, when cured, has a weight loss of less than 0.5% when thermally soaked at 180° C. for 1000 hours.

Components (A), (B), (C) and (D) may each be as follows:
Component (A) comprises at least one poly-naphthalene-based epoxy resin;
Component (B) comprises at least one non-linear multi-phenyl epoxy resin in a total amount of from 10 to 35 PHR per 100 PHR of total epoxy resin (i.e., 10 to 35 parts by weight of non-linear multi-phenyl epoxy resin per 100 parts by weight of total epoxy resin);
Component (C) comprises at least one epoxy resin having an epoxy functionality of at least three which is neither a poly-naphthalene-based epoxy resin nor a non-linear multi-phenyl epoxy resin; and
Component (D) comprises at least one amine curing agent, in particular at least one aromatic polyamine curing agent.

Component (A) may comprise at least 20 PHR in total per 100 PHR of total epoxy resin of at least one poly-naphthalene-based epoxy resin which is an epoxy resin with two or more naphthalene structures per molecule and having an epoxy functionality of at least two (i.e., component (A) may comprise at least 20 parts by weight of poly-naphthalene-based epoxy resin per 100 parts by weight of the total amount of epoxy resin in the composition). According to a preferred embodiment, the poly-naphthalene-based epoxy resin has a structure as shown in Formula (I).

—C(=O)O—, —C(=O)—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X.

According to certain embodiments, component (B) may comprise at least 10 PHR, preferably 10 to 30 PHR, in total per 100 PHR of total epoxy resin of at least one non-linear multi-phenyl epoxy resin with an epoxy functionality of three or more.

According to certain embodiments, component (C) may comprise at least one epoxy resin having an epoxy functionality of at least three which is an epoxy resin other than a poly-naphthalene-based epoxy resin or a non-linear multi-phenyl epoxy resin (i.e., an epoxy resin having three or more epoxy groups per molecule which is different from the epoxy resins of component (A) and component (B)).

In certain embodiments of the invention, component (D) comprises at least one amine curing agent, preferably at least one aromatic polyamine curing agent such as a diaminodiphenyl sulfone.

Preferably, according to certain embodiments, components (A), (B), and (C) are present in amounts effective to provide, in the epoxy resin composition, a molar ratio of active hydrogens:epoxy groups ranging from 0.8:1 to 1.2:1.

This invention further includes a cured epoxy resin obtained by curing the abovementioned epoxy resin composition, a prepreg obtained by impregnating a reinforcing fiber matrix with the abovementioned epoxy resin composition, a fiber-reinforced composite material obtained by curing the prepreg, and a fiber-reinforced composite material comprising a cured product obtained by curing a prepreg comprising the abovementioned epoxy resin composition and a reinforcing fiber base.

Formula (I)

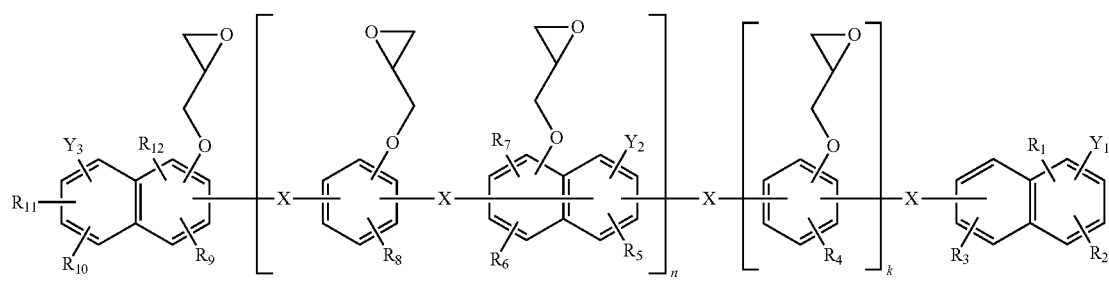

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_3$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0 or an integer of 1 to 5, k is 0 or an integer of 1 to 3, wherein the Y groups may be attached to either or both rings of each naphthalene nucleus; and each X is independently selected from the group consisting of a direct bond, —CH$_2$—, —C(CH$_3$)$_2$—, —S—, —SO$_2$—, —O—, After extensive studies, the inventors have surprisingly discovered that when a high modulus epoxy resin corresponding to component (A) as described herein (a poly-naphthalene-based epoxy resin) and a non-linear multi-phenyl epoxy resin corresponding to component (B) as described herein along with a multifunctional epoxy resin corresponding to component (C) as described herein (an epoxy resin having an epoxy functionality of at least three which is different from the epoxy resins of components (A) and (B)) at the correct ratios it is possible to achieve a high flexural modulus along with a high wet Tg in a cured resin, thus further providing better overall properties. This was unexpected, at least in part because in the prior art such epoxy resins were employed separately to achieve their intended properties. It was also found that using too much of either the high modulus resin (A) or the High Tg resin (B) would reduce the properties inversely. Most of the prior art shows how to make a high room temperature modulus resin. This, however, does not directly correlate to a high hot/wet flexural modulus resin (i.e., a resin which when cured provides a high room temperature modulus does not necessarily also have a high hot/wet flexural modulus).

Without wishing to be bound by theory, it is believed that adding small amounts of the non-linear multi-phenyl epoxy resin (B) into the mixture of components (A) and (C) binds the polymer network enough to increase the overall wet Tg while still allowing the stiffer network of the poly-naphthalene-based epoxy resin (A) to form and keep a high ETW (elevated temperature wet) flexural modulus. This, of course, can be accomplished in other ways, but when such other approaches are used the elongation at flex is not maintained, reducing the toughness of the material and thus reducing the tensile strength of the cured FRC material.

The advantages of the high ETW (hot/wet) flexural modulus allow for a prepreg with good compression modulus at higher temperatures. The high wet Tg allows the material to be used higher than normal service temperatures. Having both of these characteristics together allow for a material to have excellent mechanical properties even at higher temperatures and to sustain those properties for a long period of time without degrading. Therefore, in some embodiments of the invention the epoxy resin composition when cured will have a wet Tg greater than 190° C. In other embodiments, the epoxy resin composition when cured will have a wet Tg greater than 200° C.

The high modulus of the resin system advantageously gives the FRC higher compression properties, allowing it to be used in structural areas, both primary and secondary, for aerospace. Therefore, in some embodiments of the invention, the epoxy resin composition, when cured, will have an ETW flexural modulus ("hot/wet flexural modulus") at 121° C. of at least 1.9 GPa. In other embodiments the ETW flexural modulus ("hot/wet flexural modulus") at 121° C. of the cured epoxy resin composition is at least 2.0 GPa. According to still other embodiments, the ETW flexural modulus ("hot/wet flexural modulus") at 121° C. of the cured epoxy resin composition is at least 2.1 GPa or greater. The ETW flexural modulus ("hot/wet flexural modulus") is measured in accordance with the procedures set forth elsewhere herein, including in the Detailed Description (related to Component (C)) and the Examples.

DETAILED DESCRIPTION OF EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, or within less than 0.01% of the stated amount.

The term "room temperature" as used herein has its ordinary meaning as known to those skilled in the art and may include temperatures within the range of about 15° C. to 43° C.

The term "cure" as used herein includes curing at temperatures within the range of about 180° C. to about 220° C. for at least 2 hours.

Component (A)

Component (A) comprises one or more epoxy resins containing at least two naphthalene moieties and at least one glycidyl ether group (preferably, at least two glycidyl ether groups) per molecule. Such epoxy resins are referred to herein as "poly-naphthalene-based epoxy resins." The term "naphthalene", as used herein, describes a structure of two benzene rings which are conjugated to each other directly, as represented by the following structure:

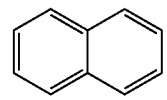

Any of the naphthalene-based monomer precursors (such as hydroxyl-substituted bi-naphthalenes) may be formed into a glycidyl epoxy resin, such as glycidyl ether epoxy resins. The diglycidyl ethers of the precursors may be formed by reacting a precursor with epichlorohydrin in the presence of a basic catalyst.

Without wishing to be bound by theory, it is believed that the poly-naphthalene-based epoxy resins, which form part of an epoxy resin composition as described herein, provide low water absorption, high flexural modulus and high heat resistance once the epoxy resin composition has been cured. Abovementioned component (A) is an essential component for an epoxy resin composition to successfully provide excellent performance, particularly under hot/wet conditions.

The poly-naphthalene-based epoxy resin may comprise one bi-naphthalene moiety (a moiety containing two naphthalene structural units) to which at least one glycidyl ether substituent is bonded. More than one glycidyl ether substituent may be bonded to the bi-naphthalene moiety at any suitable position in any suitable combination. The bi-naphthalene moiety may also have a non-glycidyl ether substituent bonded at any of the non-glycidyl ether substituted sites of either naphthalene ring. Suitable non-glycidyl ether substituent groups include, without limitation, hydrogen atom, halogen atoms, $C_1$ to $C_6$ alkyl groups, $C_1$ to $C_6$ alkoxyl groups, $C_1$ to $C_6$ fluoroalkyl groups, cycloalkyl groups, aryl groups, and aryloxyl groups and combinations thereof. Such non-glycidyl ether substituent groups may be straight, branched, cyclic, or polycyclic substituents, wherein these groups are optionally employed individually or different groups are optionally employed in combination thereof.

The poly-naphthalene-based epoxy resin may contain two, three, four or more naphthalene rings linked to each other either directly or through a linking (bridging) moiety, such as a methylene group (—$CH_2$—), with at least one glycidyl ether group (preferably at least two glycidyl ether groups) being bonded to (substituted on) a naphthalene ring (or multiple naphthalene rings, where two or more glycidyl ether groups are present). The multiple naphthalene rings may optionally be substituted with one or more further substituents, including any of the aforementioned types of substituents. Thus, in various embodiments of the invention component (A) may be comprised of one or more poly-naphthalene-based epoxy resins represented by the following Formula (III):

Formula (III)

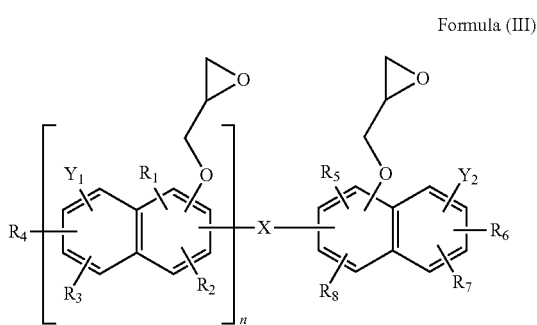

wherein n represents the number of repeating units and is an integer of 1 or more (e.g., 1 to 10); $R_1$ to $R_8$ are each independently selected from the group consisting of a hydrogen atom, halogen atoms, $C_1$ to $C_6$ alkyl groups, $C_1$ to $C_6$ alkoxyl groups, $C_1$ to $C_6$ fluoroalkyl groups, cycloalkyl groups, aryl groups, and aryloxyl groups wherein these groups are optionally employed individually or different groups are optionally employed in combination as each of $R_1$ to $R_8$; $Y_1$ and $Y_2$ are each independently selected from the group consisting of a hydrogen atom and a glycidyl ether group wherein these groups are optionally employed individually or different groups are optionally employed in combination as each of $Y_1$ and $Y_2$; and each X is independently selected from the group consisting of a direct bond, —$CH_2$—, —$C(CH_3)_2$—, —S—, —$SO_2$—, —O—, —C(=O)O—, —C(=O)—, —C(=O)NH—, $C_1$ to $C_6$ alkyl groups, $C_1$ to $C_6$ alkoxyl groups, cycloalkyl groups, aryl groups and aryloxyl groups, wherein these groups are optionally employed individually or different groups are optionally employed in combination as X.

In another embodiment, component (A) may be comprised of at least one epoxy resin represented by the following Formula (I):

selected from the group consisting of a direct bond, —$CH_2$—, —$C(CH_3)_2$—, —S—, —$SO_2$—, —O—, —C(=O)—, —C(=O)O—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X.

The glycidyl ether group(s) on the naphthalene moieties may be bonded to any of the carbon atoms of each naphthalene ring in any combination. The glycidyl ether groups may therefore be present at the 2, 3, 4, 5, 6, and/or 7 positions of any of the naphthalene rings present, and where there is more than one glycidyl ether group may be present in any suitable combination on any of the naphthalene rings of the epoxy resin.

Specific precursors which may be used for producing the poly-naphthalene-based epoxy resin having two or more naphthalene moieties per molecule, by way of example, include 1-(2-hydroxy-naphthalen-1-ylmethyl)-naphthalene-2-ol, 1-(2-hydroxy-naphthalen-1-ylmethyl)-naphthalene-2,7-diol, 1-(2-hydroxy-naphthalen-1-ylmethyl)-naphthalene-7-ol, 1-(7-hydroxy-naphthalen-1-ylmethyl)-naphthalene-7-ol, 1-(2,7-dihydroxy-naphthalen-1-ylmethyl)-naphthalene-2,7-diol, or any combination thereof. Such precursors may be reacted with epichlorohydrin, using base catalysis, to introduce the desired glycidyl ether groups as a result of the hydroxyl groups of the precursor reacting with the epichlorohydrin.

The chemical structures of specific exemplary (non-limiting) poly-naphthalene-based epoxy resins suitable for use in embodiments of the present invention are shown below.

(I)

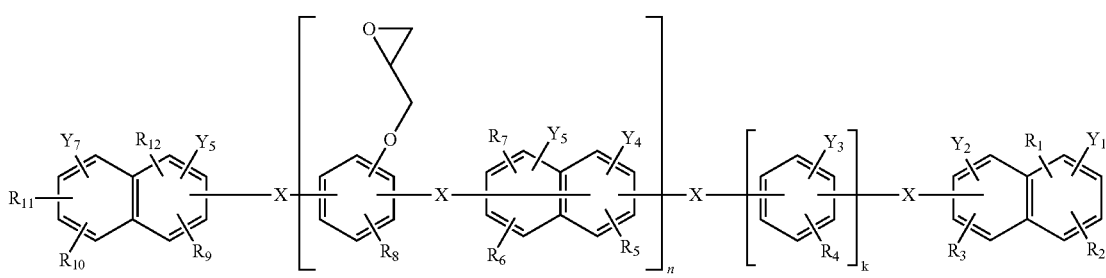

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_7$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0 or an integer of 1 to 5, k is 0 or an integer of 1 to 3, wherein the Y groups may be attached to either or both rings of each naphthalene nucleus; and each X is independently

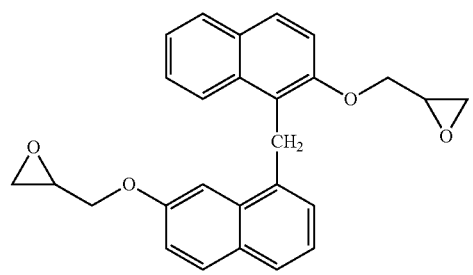

-continued

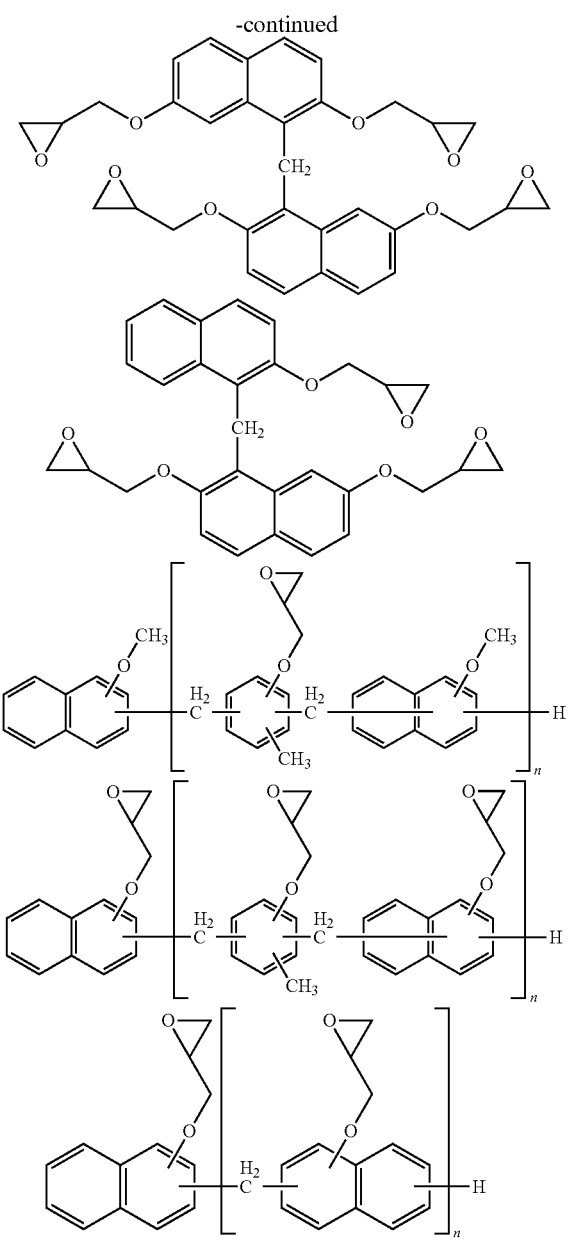

In such chemical structures, n is the number of repeating units and is an integer of 1 or more (e.g., an integer of 1 to 5).

Any two or more of the aforementioned poly-naphthalene-based epoxy resins may be used in combination as component (A).

The amount of component (A) (poly-naphthalene-based epoxy resin) may be in the range of 20 to 50 PHR per 100 PHR of total epoxy resin. In certain embodiments, the amount of poly-naphthalene-based epoxy resin may be in the range of 25 to 40 PHR or 25 to 35 PHR per 100 PHR of total epoxy resin. If the amount is less than 20 PHR, water absorption may be high and hot/wet flexural modulus may be low. If the amount is greater than 50 PHR, the resin viscosity may be high making the handling and processing of the FRC material difficult.

Examples of commercially available products suitable for use as component (A) include "Epiclon (registered trademark)" HP4700, HP4710, HP4770, EXA4701, EXA4750, and EXA7240 (manufactured by Dainippon Ink and Chemicals, Inc.), NC-7000L and NC-7300L (manufactured by Nippon Kayaku Co., Ltd.) and ESN-175 and ESN-375 (manufactured by Tohto Kasei Epoxy Co., Ltd.), etc., as well as combinations thereof.

Component (B)

In accordance with embodiments of the invention the epoxy resin also includes component (B), wherein the component (B) comprises or is an epoxy resin or more than one epoxy resin which can provide high heat resistance to the cured epoxy resin composition (i.e., an epoxy resin which helps make the epoxy resin composition resistant to heat, when cured). Such epoxy resins are referred to herein as "non-linear multi-phenyl epoxy resins." The non-linear multi-phenyl epoxy resin may have an epoxy functionality of two, three or more. According to certain embodiments, the non-linear multi-phenyl epoxy resin may have a structure corresponding to Formula (II):

$$X^1—C(Y)(Z)—X^2 \qquad \text{Formula (II)}$$

wherein $X^1$ and $X^2$ are the same or different and are each independently selected from the group consisting of glycidyl ether-substituted phenyl groups and hydroxyl-substituted phenyl groups; wherein either:
  i) Y is selected from the group consisting of glycidyl ether-substituted phenyl groups, hydroxyl-substituted phenyl groups, and —C(H)($X^3$)($X^4$), wherein $X^3$ and $X^4$ are the same or different and are each independently selected from the group consisting of glycidyl ether-substituted phenyl groups and hydroxyl-substituted phenyl groups and wherein $X^3$ and $X^4$ are the same as or different from $X^1$ and $X^2$; and Z is H; or
  ii) C(Y)(Z) represents a fluorene group, wherein the carbon atom represented by C in C(Y)(Z) is at the 9 position of the fluorene group;
and oligomers thereof;
subject to the proviso that the non-linear multi-phenyl epoxy resin comprises at least two glycidyl ether groups per molecule.

Specific illustrative examples of suitable non-linear multi-phenyl epoxy resins include, but are not limited to, tris(hydroxyphenyl) methane-based epoxy resins (where Y in Formula (II) is selected from glycidyl ether-substituted phenyl groups or hydroxyl-substituted phenyl groups) and Z is H, tetra(hydroxyphenyl) ethane-based epoxy resins (where Y in Formula (II) is —C(H)(X3)(X4) and Z is H, fluorene-based epoxy resins (where C(Y)(Z) in Formula (II) represents a fluorene group, with the carbon atom represented by C in C(Y)(Z) being at the 9 position of the fluorene group), and combinations thereof. The phenyl rings in such non-linear multi-phenyl epoxy resins may be substituted with one or more substituents other than hydrogen atom, hydroxyl groups and glycidyl ether groups, in certain embodiments of the present invention. Oligomers of such epoxy resins may also be utilized, including in combination with the monomeric forms of such epoxy resins. An epoxy resin oligomer may, for example, correspond to Formula (IV):

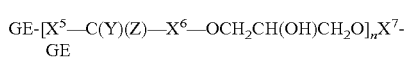
$$\text{GE-[}X^5—C(Y)(Z)—X^6—OCH_2CH(OH)CH_2O]_nX^7-\text{GE} \qquad \text{Formula (IV)}$$

wherein GE is glycidyl ether, n is an integer of at least 1 (e.g., 1-20), each $X^5$, $X^6$ and $X^7$ is the same or different and is independently selected from the group consisting of phenyl groups, glycidyl ether-substituted phenyl groups and hydroxyl-substituted phenyl groups; wherein either:

i) Y is selected from the group consisting of phenyl groups, glycidyl ether-substituted phenyl groups, hydroxyl-substituted phenyl groups, and —C(H)(X$^3$)(X$^4$), wherein X$^3$ and X$^4$ are the same or different and are each independently selected from the group consisting of glycidyl ether-substituted phenyl groups and hydroxyl-substituted phenyl groups and wherein X$^3$ and X$^4$ are the same as or different from X$^1$ and X$^2$; and Z is H; or ii) C(Y)(Z) represents a fluorene group, wherein the carbon atom represented by C in C(Y)(Z) is at the 9 position of the fluorene group.

Without wanting to be bound by theory, the combination of both the poly-naphthalene-based epoxy resin (A) and the non-linear multi-phenyl epoxy resin (B) creates a synergistic effect of increasing both the wet Tg and the modulus. This in part is believed to be due to the naphthalene structure reducing the water uptake by reducing the overall free space in the polymer structure as stated before. Then, with a component (B) the wet Tg is increased. When component (A) is used alone it does increase the wet Tg but normally only up to 180° C. Component (B), which is well known for increasing the wet Tg, inversely affects the wet modulus, limiting it to less than 2.0 GPa.

Component (B) may comprise a tris(hydroxyphenyl) methane-based epoxy resin. A tris(hydroxyphenyl)methane-based epoxy resin is an epoxy resin which is a glycidyl ether of tris(hydroxyphenyl)methane wherein two or more of the hydroxyl groups of a tris(hydroxyphenyl)methane molecule have been converted to glycidyl ether groups by reaction with epichlorohydrin, including higher oligomers of such substances (which may contain two or more tris(hydroxyphenyl)methane structural units per molecule). A tri-glycidyl ether of tris(p-hydroxylphenyl)methane is an example of a suitable tris(hydroxyphenyl)methane-based epoxy resin. Such an epoxy resin may have the following structure:

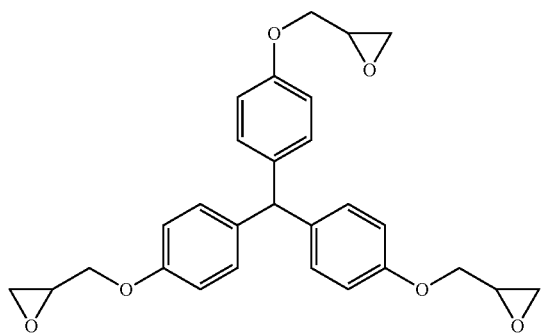

A tetra(hydroxyphenyl)ethane-based epoxy resin is an epoxy resin which is a glycidyl ether of tetra(hydroxyphenyl)ethane wherein two, three or preferably all four hydroxyl groups of a tetra(hydroxyphenyl)ethane molecule have been converted to glycidyl ether groups by reaction with epichlorohydrin, including higher oligomers of such substances (which may contain two or more tetra(hydroxyphenyl)ethane structural units per molecule). A tetra-glycidyl ether of tetra (p-hydroxyphenyl) ethane is an example of a suitable tetra(hydroxyphenyl)ethane-based epoxy resin. The structure of a representative tetraglycidyl ether of a tetra(hydroxyphenyl)ethane-based epoxy resin may be represented as follows, wherein G=glycidyl;

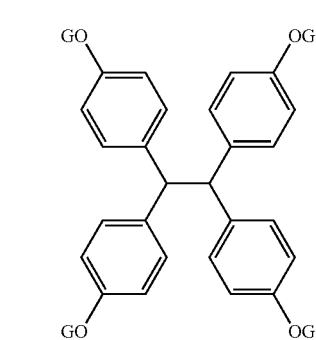

In other embodiments, one or two of the glycidyl groups may be replaced by hydrogen (H) to provide one or two hydroxyl substituents on the phenyl rings. An oligomer of a tetraglycidyl ether of a tetra(hydroxyphenyl)ethane-based epoxy resin may be represented as follows, wherein G=glycidyl:

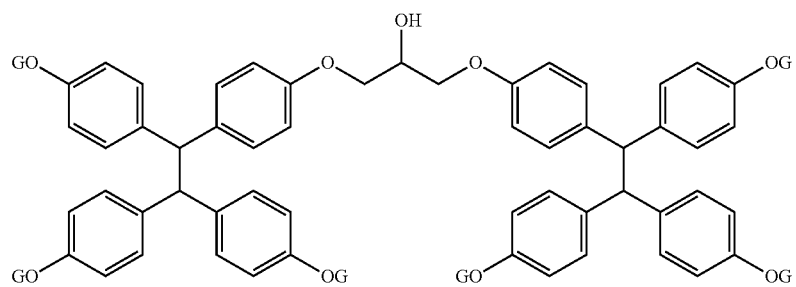

A fluorene-based epoxy resin is an epoxy resin containing fluorene (alpha-diphenylenemethane) structural units as well as epoxy functional groups. Suitable fluorene-based epoxy resins include, for example, bisphenol fluorene epoxy resins such as the diglycidyl ether of 9,9-bis(4-hydroxyphenyl) fluorene, as well as oligomers thereof containing two or more bis(4-hydroxyphenyl)fluorene structural units per molecule. Fluorene-based epoxy resins are well known in the art and are described, for example, in Korshak et al., Vysokornol Soedin 1971, 13, 150; Lin et al., J Polym Sci Polym Chem Ed 1979, 17, 3121; and Chen et al., J Appl Polym Sci 1982, 27, 3289, each of which is incorporated herein by reference in its entirety for all purposes.

The following is an example of a fluorene-based epoxy resin suitable for use in or as component (B) of the present invention:

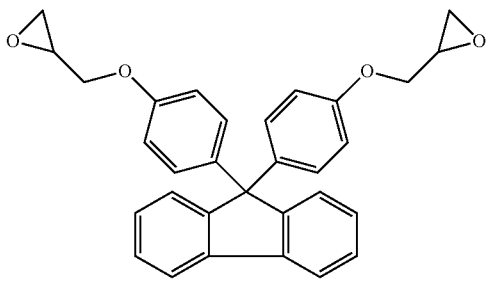 [SMILES: c1ccc2c(c1)-c1ccccc1C2(c1ccc(OCC2CO2)cc1)c1ccc(OCC2CO2)cc1]

The amount of component (B) (non-linear multi-phenyl epoxy) may be in the range of 10 to 35 PHR per 100 PHR of total epoxy resin. In certain embodiments, the amount of naphthalene-based epoxy resin may be in the range of 10 to 20 PHR per 100 PHR of total epoxy resin. If the amount is less than 10 PHR, the heat resistance may be too low. If the amount is greater than 35 PHR, the wet modulus may be too low and the viscosity may be high making the handling and processing of the FRC material may be difficult.

Examples of commercially available tris(hydroxyphenyl) methane-based epoxy resins include Tactix® 742 from Huntsman Advanced Materials and EXA7250 from DIC Corporation.

Examples of commercially available tetra(hydroxyphenyl) ethane-based epoxy resins include XB 4399-3 from Huntsman Advanced Materials.

Examples of available fluorene-based epoxy resins include LME 10169 from Huntsman Advanced Materials.

Component (C)

In accordance with embodiments of the invention, the epoxy resin composition also comprises component (C) wherein the component (C) comprises or is an epoxy resin or more than one epoxy resin other than a poly-naphthalene-based epoxy resin as defined herein and used as component (A) and other than a non-linear multi-phenyl epoxy resin as defined herein as used as component (B), to improve the cross linking and processability. Epoxy resins useful in or as component (C) have an epoxy functionality of at least three (meaning that they contain three or more epoxy groups per molecule).

Component (C) is used to increase the processability without decreasing the overall properties of the resin composition. This is needed since most poly-naphthalene-based epoxy resins and most non-linear multi-phenyl epoxy resins are solid at room temperature and have a very low minimum viscosity when heated. With these properties, final formulation of the epoxy resin composition cannot be accomplished when using the material for prepreg manufacturing.

These epoxy resins (epoxies) useful as component (C) may be prepared from precursors such as amines (e.g., epoxy resins prepared using diamines and compounds containing at least one amine group and at least one hydroxyl group such as tetraglycidyl diaminodiphenyl methane, tetraglycidyl diaminodiphenylether, tetraglycidyl diaminodiphenylsulfone, tetraglycidyl diaminodiphenylamide, triglycidyl-p-aminophenol, triglycidyl-m-aminophenol, triglycidyl aminocresol and tetraglycidyl xylylenediamine and halogen-substituted products, alkynol-substituted products, hydrogenated products thereof and so on), naphthalene epoxy resins (epoxy resins containing only a single naphthalene moiety per molecule) having an epoxy functionality of at least three, epoxy resins having a biphenyl skeleton and an epoxy functionality of at least three, and isocyanate-modified epoxy resins having an epoxy functionality of at least three. It should be noted that the epoxy resins suitable for use in component (C) are not restricted to the examples above. Halogenated epoxy resins prepared by halogenating these epoxy resins can also be used.

Examples of commercially available products useful as or in component (C) include: amine base epoxy resins such as YH434L (manufactured by Nippon Steel Chemical Co., Ltd.), "jER (registered trademark)" 604 (manufactured by Mitsubishi Chemical Corporation)", TG3DAS (manufactured by Konishi Chemical Ind. Co., Ltd.), "Sumiepoxy (registered trademark)" ELM434 and, ELM100 (manufactured by Sumitomo Chemical Co., Ltd.), "Araldite (registered trademark)" MY9655T, MY720, MY 721, MY 722, MY 0500, MY 0510, MY 0600, and MY 0610, (manufactured by Huntsman Advanced Materials), "jER (registered trademark)" 630 (manufactured by Mitsubishi Chemical Corporation), and TETRAD-X and TETRAD-C (manufactured by Mitsubishi Gas Chemical Company, Inc.).

In some of the embodiments, the abovementioned component (C) may comprise component (C1) and component (C2) which are epoxy resins different from each other, wherein component (C1) is an epoxy resin having more than two epoxy-functional groups per molecule and component (C2) is an epoxy resin different from component (C1) and having two or more epoxy-functional groups per molecule. Without wishing to be bound by theory, it is believed that the component (C) epoxy resin provides high cross linking and high strength once the epoxy resin composition has been cured. It is also believed that the component (C) epoxy resin provides high elongation and low viscosity resin for handleability and tackiness. "Handleability" refers to the ability to easily handle and process the material.

The amount of component (C) may be in the range of 30 to 80 PHR per 100 PHR of total epoxy resin (i.e., component (C) may be present in an amount which is from 30 to 80 parts by weight per 100 parts by weight of the total amount of epoxy resin in the composition). If the amount is less than 30 PHR, the strength of the FRC material obtained may be impaired. If the amount is greater than 80 PHR, the water absorption may be high and the FRC material obtained may have low compression strength.

The viscosity of the epoxy resin composition at 40° C. may be between $1\times10^3$ and $3\times10^4$ Pa·s, in order to achieve both handleability and processability of the uncured FRC prepreg while maintaining the mechanical properties of the cured FRC. If the viscosity at 40° C. is too low, the handleability may be compromised because the tack may be too high. If the viscosity at 40° C. is too high, the moldability of the uncured FRC may be unsatisfactory because the tack may be too low and the prepreg becomes too brittle. Also, the minimum viscosity of the epoxy resin composition should be greater than 1 Pa·s. If the minimum viscosity is too low than the resin flow will be to great and special handling and molding procedures will be needed making the material difficult to work with (such as by losing too much resin due to bleed out). The viscosity of the epoxy resin composition was measured using a dynamic viscoelasticity measuring device (ARES, manufactured by TA Instruments) using parallel plates with a diameter of 40 mm while increasing the temperature at a rate of 2° C./min, with a strain of 10%, frequency of 0.5 Hz, and plate interval of 1 mm, from 40° C. to 150° C. The viscosity of the epoxy resin composition may be adjusted and controlled as may be desired by selecting particular components for use in the composition. In particular, the types and relative proportions of the epoxy resins present as components (A), (B) and (C) may be varied as needed to adjust the viscosity of the overall composition.

For example, a component (C) having a relatively low viscosity at 40° C. may be introduced for the purpose of reducing the viscosity of an epoxy resin composition that, due to the other components present, would otherwise have a viscosity at 40° C. that is higher than would be preferred.

The cured epoxy resin composition comprising components (A), (B), (C) and (D) is capable, in at least certain embodiments, of being cured at 210° C. for 2 hours to achieve a degree of cure ("DoC") of at least 90%. If the degree of cure is less than 90%, the cured resin will have low heat resistance and the FRC material obtained will have low mechanical properties. The DoC of an epoxy resin composition can be determined by use of a Differential Scanning Calorimeter (DSC, manufactured by TA Instruments). The DoC value is obtained by empirically comparing the exothermic reaction peak area of an uncured resin ($\Delta H_{uncured}$) against the residual exothermic reaction peak area of a cured resin ($\Delta H_{cured}$). Herein, the DoC can be calculated by the following formula:

$$\text{Degree of Cure, } DoC (\%) = \frac{\Delta H_{uncured} - \Delta H_{cured}}{\Delta H_{uncured}} \times 100$$

Where: $\Delta H_{uncured}$=exothermic reaction peak area of an uncured resin $\Delta H_{cured}$=exothermic reaction peak area of an cured resin The epoxy resin composition comprising component (A) may also have, when cured, a hot/wet flexural modulus at 121° C. of at least 1.9 GPa. In other embodiments, the hot/wet flexural modulus at 121° C. is at least 2.0 GPa. In still other embodiments, the cured epoxy resin composition has a hot/wet flexural modulus at 121° C. of at least 2.1 GPa. If the hot/wet flexural modulus at 121° C. is less than 1.9 GPa, the FRC material obtained will have low compression strength. The flexural modulus of the cured epoxy resin can be determined by 3-point bending test in accordance with ASTM D 7264 using an Instron Universal Testing Machine manufactured by Instron.

Component (D)

As a curing agent, an amine-based curing agent (or a combination of different amine-based curing agents) is suitable for curing the epoxy resin composition. The amine-based curing agent is a compound that contains at least one nitrogen atom in the molecule (i.e., it is an amine-containing curing agent) and is capable of reacting with epoxy groups in the epoxy resins for curing. The nitrogen atom(s) may be in the form of primary and/or secondary amino groups. Without wishing to be bound by theory, it is believed that the amine-based curing agents utilized in the present embodiment provide high heat resistance and storage stability.

In some of the embodiments, component (D) comprises at least one aromatic polyamine curing agent, i.e., a curing agent containing two or more amine groups and one or more aromatic rings per molecule. One suitable type of aromatic polyamine curing agent for component (D) is a diaminodiphenyl sulfone. Specific illustrative examples of suitable diaminodiphenyl sulfones include, but are not limited to, 4,4'-diaminodiphenyl sulfone (4,4'-DDS) and 3,3'-diaminodiphenyl sulfone (3,3'-DDS) and combinations thereof. In certain embodiments of the invention, component (D) consists essentially of or consists of one or more diaminodiphenyl sulfones. In such embodiments, diaminodiphenyl sulfone is the only type of curing agent present in the epoxy resin composition or constitutes at least 90%, at least 95%, or at least 99% by weight of the entire amount of curing agent.

In most embodiments it is particularly advantageous to use diaminodiphenyl sulfone. This is due to the fact that it has very good latency properties specifically when being used for prepreg allowing it to be stored at ambient temperature for long periods of time. Also the material has very good stability during high temperature processing of the resin material. Diaminophenyl sulfone also has good cured properties such as good solvent and moisture resistance at elevated temperatures.

When using diaminodiphenyl sulfone alone as a curing agent, the amount of component (D) is present in an amount and component (A), component (B), and component (C) preferably are present in a total amount effective to provide a molar ratio of active hydrogens to epoxy groups ranging from 0.8:1 to 1.2:1.

If the molar ratio is less than 0.8, the amount of epoxy to epoxy reactions will increase reducing both the Tg and mechanical properties of the FRC material. If the molar ratio is greater than 1.2, the degree of cure may be insufficient due to the excess of unreacted amine curing agent. Thus the mechanical properties of the FRC material obtained may also be adversely affected.

Examples of commercially available products suitable for use as component (D) include "Aradur (registered trademark)" 9664-1 and 9791-1 (manufactured by Huntsman Advanced Materials).

In other embodiments, any curing agents other than the abovementioned diaminodiphenyl sulfone may be added to the epoxy resin composition, as long as the effect of the invention is not deteriorated. Examples of other curing agents include polyamides, aromatic amidoamines (e.g., aminobenzamides, aminobenzanilides, and aminobenzene sulfonamides), aromatic diamines (e.g., diamino diphenylmethane, and m-phenylenediamine), tertiary amines (e.g., N—N-dimethylaniline, N,N-dimethylbenzylamine, and 2,4, 6-tris(dimethylaminomethyl) phenol), aminobenzoates (e.g., trimethylene glycol di-p-aminobenzoate and neopentyl glycol di-p-amino-benzoate), aliphatic amines (e.g., diethylenetriamine, triethylenetetramine, isophoronediamine, bis (amineomethyl) norbornane, bis(4-amino cyclohexyl) methane, dimer acid esters of polyethyleneimine), imidazole derivatives (e.g., 2-methylimidazole,1-benzyl-2-methylimidazole, 2-ethyl-4-methylimidazole), carboxylic acid anhydrides (e.g., methylhexa hydrophthalic anhydride), carboxylic acid hydrazides (e.g., adipic acid hydrazide, naphthaelencarboxylie acid hydrazide), tetramethylguanidine, carboxylic acid amides, polyphenol compounds, polysulfides and mercaptans, and Lewis acids and bases (e.g., boron trifluoride ethylamine and tris-(diethylaminomethyl) phenol), etc. For example, in embodiments where component (D) consists of diaminodiphenylsulfone or dicyandiamide and diaminodiphenyl sulfone, the epoxy resin composition may optionally additionally contain one or more of the above-mentioned curing agents. However, in other embodiments, the epoxy resin composition does not contain any curing agent other than the aforementioned diamino diphenylsulfone.

In certain embodiments, the cure profile is not particularly limited, as long as the effect of the invention is not deteriorated. If a higher Tg is desired, the epoxy resin composition can be cured at higher temperature. For example, the epoxy resin composition may have a wet Tg of 190° C. or greater when the composition is cured at 210° C. for 2 hours. In other embodiments, the wet Tg will be greater than 200° C.

In still other embodiments the wet Tg will be greater than 210° C. The Tg of a cured epoxy resin can be determined by using a torsional Dynamic Mechanical Analyzer (ARES, manufactured by TA Instruments).

In certain embodiments, the epoxy resin composition comprising the abovementioned components (A)-(D) may exhibit an increase in viscosity (as measured at 65° C.) of less than 2 times the starting viscosity when held at 65° C. for 2 hours. If the viscosity increase is less than 2 times, the resin composition may be considered as stable. If the viscosity increase is more than 2 times, the resin composition may be considered as unstable and the shelf-life may be shortened. The viscosity increase of the resin may be measured by setting the parameters of a dynamic viscoelasticity measuring device (ARES, manufactured by TA instruments) per the same method for viscosity measurement and holding at desired temperature for certain amount of time, in this case, 65° C. for 2 hours.

The viscosity increase is calculated using the equation below:

$$\text{viscosity increase} = \frac{\eta_{final}}{\eta_{initial}}$$

$\eta_{initial}$ is the initial viscosity of the resin at 65° C.
$\eta_{final}$ is the final viscosity of the resin at 65° C. after 2 hours In certain embodiments, the epoxy resin composition comprising the abovementioned components (A)-(D) may exhibit good thermal degradation stability. If the cured epoxy resin composition is cured at 210° C. for 2 hours and then soaked in a convection oven ("thermally soaked") at 180° C. for 1000 hours and has a weight loss less than 1.0% it is considered to have good thermal stability. In other embodiments of the invention, the cured epoxy resin composition will have a thermal degradation less than 0.7% after being thermally soaked at 180° C. for 1000 hours. In still other embodiments, the cured epoxy resin composition will have a thermal degradation less than 0.5% after being thermally soaked at 180° C. for 1000 hours.

Thermoplastic resin may be included in the epoxy resin composition, as long as the effect of the invention is not deteriorated. For example, the epoxy resin composition may contain at least 1 PHR or at least 5 PHR thermoplastic resin and/or not more than 30 PHR or not more than 25 PHR or not more than 20 PHR thermoplastic resin per 100 PHR of total epoxy resin (i.e., the epoxy resin composition may comprise at least 1 part by weight, or at least 5 parts by weight and/or not more than 30 parts by weight or not more than 25 parts by weight or not more than 20 parts by weight thermoplastic resin per 100 parts by weight of the total amount of epoxy resin in the composition). Without wishing to be bound by theory, it is believed that thermoplastic resins provide maximum fracture toughness and impact resistance to the cured epoxy resin composition. Such thermoplastic resins include, but are not limited to, elastomers, branched polymers, hyperbranched polymers, dendrimers, rubbery polymers, rubbery copolymers, and block copolymers, and core-shell particles, with or without surface modification or functionalization. Examples of suitable thermoplastic resins include thermoplastic resins that are soluble in an epoxy resin and organic particles such as rubber particles and thermoplastic resin particles. As the thermoplastic resin that is soluble in an epoxy resin, a thermoplastic resin having a hydrogen-bonding functional group, which may have an effect of improving the adhesion between a cured epoxy resin and a reinforcing fiber, may be used. Examples of thermoplastic resins which are soluble in an epoxy resin and have hydrogen-binding functional groups include thermoplastic resins having one or more alcoholic hydroxy groups, thermoplastic resins having one or more amide bonds, and thermoplastic resins having one or more sulfonyl groups. Furthermore, the thermoplastic resin can be crystalline or amorphous.

Examples of thermoplastic resins having hydroxyl groups include polyvinyl acetal resins such as polyvinyl formal and polyvinyl butyral, polyvinyl alcohols and phenoxy resins. Examples of thermoplastic resins having amide bonds include polyamide, polyimide and polyvinyl pyrrolidone. An example of a thermoplastic resin having one or more sulfonyl groups is polysulfone. The polyamide, the polyimide and the polysulfone may have a functional group such as an ether bond and a carbonyl group in the main chain thereof. The polyamide may have a substituent on a nitrogen atom in the amide group.

Examples of commercially available thermoplastic resins soluble in an epoxy resin and having a hydrogen-binding functional group include: polyvinyl acetal resins such as "Denkabutyral (registered trademark)" and "Denkaformal (registered trademark)" (manufactured by Denki Kagaku Kogyo Kabushiki Kaisha) and "Vinylec (registered trademark)" (manufactured by JNC Corporation); phenoxy resins such as "UCAR (registered trademark)" PKHP (manufactured by Union Carbide Corporation); polyamide resins such as "Macromelt (registered trademark)" (manufactured by Henkel-Hakusui Corporation) and "Amilan (registered trademark)" CM4000 (manufactured by Toray Industries Inc.); polyimides such as "Ultem (registered trademark)" 1000P (manufactured by General Electric Co., Ltd.) and "Matrimid (registered trademark)" 5218 (manufactured by Ciba Inc.); polysulfones such as "SumikaExcel (registered trademark)" PES5003P (manufactured by Sumitomo Chemical Co., Ltd.), "UDEL (registered trademark)" (manufactured by Solvay Advanced Polymers Kabushiki Kaisha), and "Virantage (registered trademark) VW-10700RFP (manufactured by Solvay Plastics); and polyvinyl pyrrolidone such as "Luviskol (registered trademark)" (manufactured by BASF Japan Ltd.). Suitable polyethersulfones, for example, may have a number average molecular weight of from about 10,000 to about 75,000 g/mol.

For certain embodiments, any type(s) of additive(s) may be added, as long as the effect of the present invention is not deteriorated. Rubber particles may be added. As for the rubber particles, crosslinked rubber particles and core-shell rubber particles produced by the graft polymerization of different polymers on the surfaces of crosslinked rubber particles may be used, from the viewpoint of handling properties.

Examples of commercially available crosslinked rubber particles include FX501P (manufactured by Japan Synthetic Rubber Corporation), which comprises a crosslinked product of a carboxyl-modified butadiene-acrylonitrile copolymer, and CX-MN series (manufactured by Nippon Shokubai Co., Ltd.) and YR-500 series (manufactured by Nippon Steel Chemical Co., Ltd.), each of which comprises acrylic rubber microparticles.

Examples of commercially available core-shell rubber particle products include "Paraloid (registered trademark)" EXL-2655 (manufactured by Kureha Corporation), which comprises a butadiene-alkyl methacrylate-styrene copolymer, "Staphyloid (registered trademark)" AC-3355 and TR-2122 (manufactured by Takeda Pharmaceutical Co., Ltd.), each of which comprises an acrylic acid ester-methacrylic acid ester copolymer, "PARALOID (registered trademark)" EXL-2611 and EXL-3387 (manufactured by Rohm & Haas) each of which comprises a butyl acrylate-methyl methacrylate copolymer, and "Kane Ace (registered trademark)" MX series (manufactured by Kaneka Corporation).

The acrylic resin has high incompatibility with an epoxy resin, and therefore may be used suitably for controlling viscoelasticity. Examples of commercially available acrylic resin products include "Dianal (registered trademark)" BR series (manufactured by Mitsubishi Rayon Co., Ltd.), "Matsumoto Microsphere (registered trademark)" M, M100 and M500 (manufactured by Matsumoto Yushi-Seiyaku Co., Ltd.), and "Nanostrength (registered trademark)" E40F, M22N and M52N (manufactured by Arkema).

As for the thermoplastic resin particles, polyamide particles and polyimide particles may be used. Polyamide particles are most preferable for greatly increasing the impact resistance of the cured epoxy resin composition due to their excellent toughness. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin. Examples of suitable commercially available polyamide particles include SP-500 (manufactured by Toray Industries Inc.) and "Orgasol (registered trademark)" (manufactured by Arkema), "Grilamid (registered trademark)" TR-55 (manufactured by EMS-Grivory), and "Trogamid (registered trademark)" CX (manufactured by Evonik).

Furthermore, any type of inorganic particle such as clay may be included in the epoxy resin composition, as long as the effect of the present invention is not deteriorated. Examples of suitable inorganic particles include metallic oxide particles, metallic particles and mineral particles. The inorganic particles may be used to improve one or more functions of the cured epoxy resin composition and to impart one or more functions to the cured epoxy resin composition. Examples of such functions include surface hardness, antiblocking property, heat resistance, barrier property, conductivity, antistatic property, electromagnetic wave absorption, UV shield, toughness, impact resistance, and low coefficient of linear thermal expansion. Examples of other suitable inorganic materials include aluminum hydroxide, magnesium hydroxide, glass beads, glass flakes and glass balloons.

Examples of suitable metallic oxides include silicon oxide, titanium oxide, zirconium oxide, zinc oxide, tin oxide, indium oxide, aluminum oxide, antimony oxide, cerium oxide, magnesium oxide, iron oxide, tin-doped indium oxide (ITO), antimony-doped tin oxide and fluorine-doped tin oxide. Examples of suitable metals include gold, silver, copper, aluminum, nickel, iron, zinc and stainless. Examples of suitable minerals include montmorillonite, talc, mica, boehmite, kaoline, smectite, xonotlite, vermiculite and sericite.

Examples of other suitable carbonaceous materials include carbon black, acetylene black, Ketjen black, carbon nanotubes, graphenes, carbon nanofibers, carbon nanobeads, fullerenes, etc.

Any size of inorganic particles may be used; for example, the inorganic particles may have a size which is in the range of 1 nm to 10 μm. Any shape inorganic particles may be used; for example, the inorganic particles may be spherical, needles, plates, balloons or hollow in shape. The inorganic particles may be just used as powder or used as a dispersion in a solvent-like sol or colloid. Furthermore, the surface of the inorganic particle may be treated by a coupling agent to improve the dispersability and the interfacial affinity with the epoxy resin.

In certain embodiments, the epoxy resin composition may contain one or more other materials in addition to the abovementioned materials, as long as the effect of the present invention is not deteriorated. Examples of other materials include mold release agents, surface treatment agents, flame retardants, antibacterial agents, leveling agents, antifoaming agents, thixotropic agents, heat stabilizers, light stabilizers, UV absorbers, pigments, coupling agents and metal alkoxides.

Particularly advantageous epoxy resin compositions in accordance with embodiments of the present invention include epoxy resin compositions which comprise, consist essentially of, or consist of:

(A) at least 20 PHR in total per 100 PHR of total epoxy resin of at least one poly-naphthalene-based epoxy resin having Formula (I):

Formula (I)

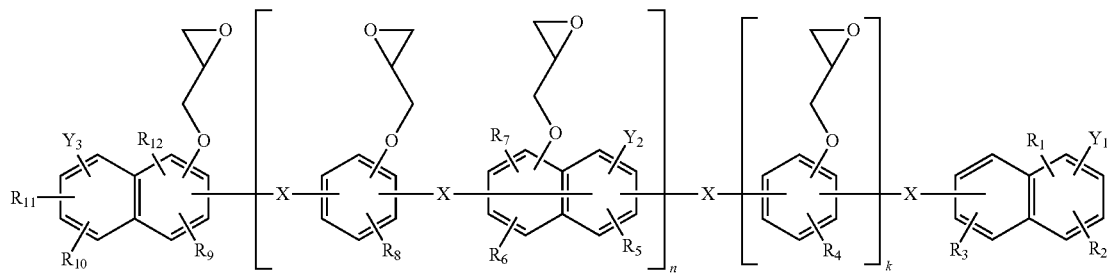

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_3$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0 or an integer of 1 to 5, k is 0 or an integer of 1 to 3, wherein the Y groups may be attached to either or both rings of each naphthalene nucleus; and each X is independently selected from the group consisting of a direct bond, —CH$_2$—, —C(CH$_3$)$_2$—, —S—, —SO$_2$—, —O—, —C(=O)O—, —C(=O)—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X;

(B) at least one non-linear multi-phenyl epoxy resin with an epoxy functionality of three or more selected from the group consisting of tris and higher (hydroxyphenyl) methane-based epoxy resins, tetra(hydroxyphenyl) ethane-based epoxy resins, fluorene-based epoxy resins, oligomers thereof, and combinations thereof in an amount of at least 10 PHR in total per 100 PHR of total epoxy resin;

(C) at least one epoxy resin having an epoxy functionality of at least three which is neither a poly-naphthalene-based epoxy resin nor a non-linear multi-phenyl epoxy resin and which is a glycidyl ether of a diamine or a compound containing at least one amine group and at least one hydroxyl group per molecule;

(D) at least one curing agent which comprises at least one diaminodiphenyl sulfone, wherein component (D and components (A), (B), and (C) are present in amounts effective to provide a molar ratio of active hydrogens: epoxy groups ranging from 0.8:1 to 1.2:1;

(E) at least one thermoplastic resin selected from the group consisting of polyethersulfones in an amount of from 5 to 30 PHR per 100 PHR of total epoxy resin; and (F) optionally, organic particles.

The components of the epoxy resin composition may be mixed in a kneader, planetary mixer, triple roll mill, twin screw extruder, and the like. The epoxy resins and any thermoplastic resins, excluding curing agents and catalysts, are added in the selected equipment. The mixture is then heated to a temperature in the range of 130 to 180° C. while being stirred so as to uniformly dissolve the epoxy resins. After this, the mixture is cooled down to a temperature of no more than 100° C., while being stirred, followed by the addition of the curing agents and catalysts and kneading to disperse those components. This method may be used to provide an epoxy resin composition with excellent storage stability.

There are no specific limitations or restrictions on the type of a reinforcing fiber that can be used, as long as the effects of the invention are not deteriorated. Examples include glass fibers, carbon fibers, and graphite fibers such as S glass, S-1 glass, S-2 glass, S-3 glass, E-glass, and L-glass fibers, organic fibers such as aramid fibers, boron fibers, metal fibers such as alumina fibers, silicon carbide fibers, tungsten carbide fibers, and natural/bio fibers. Particularly, the use of carbon fiber may provide cured FRC materials which have exceptionally high strength and stiffness and which are lightweight as well. Examples of suitable carbon fibers are those from Toray Industries having a standard modulus of about 200-250 GPa (Torayca® T300, T300J, T400H, T600S, T700S, T700G), an intermediate modulus of about 250-300 GPa (Torayca® T800H, T800S, T1000G, M30S, M30G), or a high modulus of greater than 300 GPa (Torayca® M40, M35J, M40J, M46J, M50J, M55J, M60J). Among these carbon fibers, one with standard modulus, strength of 4.9 GPa or higher and elongation of 2.1% or higher is used in the examples.

The form and the arrangement of a layer of reinforcing fibers used are not specifically limited. Any of the forms and spatial arrangements of the reinforcing fibers known in the art such as long fibers in a direction, chopped fibers in random orientation, single tow, narrow tow, woven fabrics, mats, knitted fabrics, and braids may be employed. The term "long fiber" as used herein refers to a single fiber that is substantially continuous over 10 mm or longer or a fiber bundle comprising the single fibers. The term "short fibers" as used herein refers to a fiber bundle comprising fibers that are cut into lengths of shorter than 10 mm. Particularly in the end use applications for which high specific strength and high specific elastic modulus are desired, a form wherein a reinforcing fiber bundle is arranged in one direction may be most suitable. From the viewpoint of ease of handling, a cloth-like (woven fabric) form is also suitable for the present invention.

The FRC materials of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The prepreg lamination and molding method is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain an FRC material.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by processing through a squeeze die and heating die for molding and curing, by continuously drawing the impregnated reinforcing fibers using a tensile machine. Since this method offers the advantage of continuously molding FRC materials, it is used for the manufacture of FRC materials for fishing rods, rods, pipes, sheets, antennas, architectural structures, and so on. Of these methods, the prepreg lamination and molding method may be used to give excellent stiffness and strength to the FRC materials obtained.

Prepregs may contain the epoxy resin composition and reinforcing fibers. Such prepregs may be obtained by impregnating a reinforcing fiber base material with an epoxy resin composition of the present invention. Impregnation methods include the wet method and hot-melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition. The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method may give a prepreg having virtually no residual solvent in it.

The prepreg may have a carbon fiber areal weight of between 40 to 500 g/m$^2$. If the carbon fiber areal weight is less than 40 g/m$^2$, there may be insufficient fiber content, and the FRC material may have low strength. If the carbon fiber areal weight is more than 500 g/m$^2$, the drapability of the prepreg may be impaired. The prepreg may also have a resin content of between 20 to 70 wt %. If the resin content is less than 20 wt %, the impregnation may be unsatisfactory, creating large number of voids. If the resin content is more than 70 wt %, the FRC mechanical properties will be impaired.

Appropriate heat and pressure may be used under the prepreg lamination and molding method, the press molding method, autoclave molding method, bagging molding method, wrapping tape method, internal pressure molding method, or the like.

The autoclave molding method is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range (in one embodiment of the invention, in the range of 180° C. to 220° C., e.g., 200° C. to 220° C.).

The wrapping tape method is a method in which prepregs are wrapped around a mandrel or some other cored bar to form a tubular FRC material. This method may be used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 100 N. The curing temperature may be in the 90 to 300° C. range (in one embodiment of the invention, in the range of 180° C. to 220° C., e.g., 200° C. to 220° C.).

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 300° C. or in the 180 to 275° C. range (in one embodiment of the invention, in the range of 180° C. to 220° C., e.g., 200° C. to 220° C.).

The FRC materials that contain cured epoxy resin compositions obtained from epoxy resin compositions of the present invention and reinforcing fibers are advantageously used in general industrial applications, as well as aeronautics and space applications. The FRC materials may also be used in other applications such as sports applications (e.g. golf shafts, fishing rods, tennis or badminton rackets, hockey sticks and ski poles) and structural materials for vehicles (e.g. automobiles, bicycles, marine vessels and rail vehicles, drive shafts, leaf springs, windmill blades, pressure vessels, flywheels, papermaking rollers, roofing materials, cables, and repair/reinforcement materials).

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The present embodiments are now described in more detail by way of examples. The measurement of various properties was carried out using the methods described below. Those properties were, unless otherwise noted, measured under environmental conditions comprising a temperature of 23° C. and a relative humidity of 50%. The components used in the examples are as follows:

Torayca T700G-12K-31E Unidirectional Carbon fiber (registered trademark, manufactured by Toray Industries Inc.) having a fiber count of 12,000, tensile strength of 4900 MPa, tensile modulus of 240 GPa, and tensile elongation of 1.8%.

NC-7000L (registered trademark, manufactured by Nippon Kayaku) having an epoxide equivalent weight (EEW) of 227 g/eq.

"Epiclon" (registered trademark) HP-4770 (manufactured by DIC Corporation) having an epoxide equivalent weight (EEW) of 205 g/eq.

NC-7000H (manufactured by Nippon Kayaku) having an epoxide equivalent weight (EEW) of 227 g/eq.

"Epiclon" (registered trademark) HP-5000L (manufactured by DIC Corporation) having an average epoxide equivalent weight (EEW) of 252 g/eq.

4-Glycidyloxy-N,N-diglycidylaniline, "Araldite (registered trademark)" MY 0510 (manufactured by Huntsman Advanced Materials) having an average epoxide equivalent weight (EEW) of 101 g/eq.

Tetraglycidyl diaminodiphenyl methane, "Araldite (registered trademark)" MY 721 (manufactured by Huntsman Advanced Materials) having an average epoxide equivalent weight (EEW) of 112 g/eq.

XB4399-3 (manufactured by Huntsman Advanced Materials) having an average epoxide equivalent weight (EEW) of 228 g/eq.

"Epiclon (registered trademark)" EXA-7250 (manufactured by DIC Corporation) having an average epoxide equivalent weight (EEW) of 162 g/eq.

EPPN-501H (manufactured by Nippon Kayaku Corporation) having an average epoxide equivalent weight (EEW) of 167 g/eq.

"Epon (registered trademark)" 828 (manufactured by Hexion), which is a bisphenol A epichlorohydrin epoxy resin having an epoxide equivalent weight (EEW) of 175-180 g/eq.

N,N-Diglycidylaniline (GAN) "Technirez (registered trademark)" GAN (manufactured by ACCI Specialty Materials) having an average epoxide equivalent weight (EEW) of 115 g/eq.

4,4'-Diaminodiphenyl sulfone (4,4'-DDS), "Aradur (registered trademark)" 9664-1 (manufactured by Huntsman Advanced Materials).

3,3'-Diaminodiphenyl sulfone (3,3'-DDS), "Aradur (registered trademark)" 9791-1 (manufactured by Huntsman Advanced Materials).

Polyethersulfone, "Virantage (registered trademark)" VW10700RFP polyethersulfone (manufactured by Solvay Advanced Polymers) having a number average molecular weight of 21,000 g/mol.

"SumikaExcel (registered trademark)" PES5003P polyethersulfone (manufactured by Sumitomo Chemical Co., Ltd.).

Methods

The following methods were used to prepare and measure the epoxy resin composition, the prepreg and the FRC material for each example.

(1) Resin Mixing

A mixture was created by dissolving prescribed amounts of all the components other than the curing agent and curing accelerator (curing catalyst) in a mixer, and then prescribed amounts of the curing agent were mixed into the mixture along with prescribed amounts of the accelerator to obtain the epoxy resin composition.

(2) Cured Profile

The cured epoxy resin composition was molded by the following method described in this section. After mixing, the epoxy resin composition prepared in (1) was injected into a mold set for a thickness of 2 mm using a 2 mm-thick "Teflon (registered trademark)" spacer. Then, the epoxy resin composition was heated at a rate of 1.7° C./min from room temperature to 210° C. and then kept for 2 hours at 210° C. to obtain 2 mm-thick cured epoxy resin composition plates.

(3) Degree of Cure

In other embodiments of the present invention, the epoxy resin composition may be cured to have a certain degree of cure. The percent cure or degree of cure (DoC) of an epoxy resin composition can be determined using a Differential Scanning Calorimeter (DSC) (Q200 with an RCS (mechanical refrigeration cooling system), manufactured by TA Instruments). The degree of cure is empirically determined by comparing the exothermic reaction peak area of an uncured resin ($\Delta H_{uncured}$) against the residual exothermic reaction peak area of a cured resin ($\Delta H_{cured}$), using a ramp rate of 10°/min. The uncured epoxy resin composition obtained in (1) was subjected to a dynamic scan with a heating rate of 10° C./min from −50° C. to a final temperature at which the exothermic reaction is completed and above which thermal degradation might occur. The cured epoxy resin composition obtained in (2) was subjected to a dynamic scan with a heating rate of 10° C./min from 50° C. to a final temperature at which the exothermic reaction is completed and above which thermal degradation might occur. Herein, the degree of cure can be calculated by the following formula:

$$\text{Degree of cure, } DoC(\%) = \frac{\Delta H_{uncured} - \Delta H_{cured}}{\Delta H_{uncured}} \times 100$$

Where: $\Delta H_{uncured}$=exothermic reaction peak area of an uncured resin $\Delta H_{cured}$=exothermic reaction peak area of a cured resin (4) Glass Transition Temperature (Tg) of Cured Epoxy Resin Composition In other embodiments of the present invention, the epoxy resin composition may have a certain Tg (glass transition temperature). The Tg may be determined using the following method. A specimen measuring 12 mm×50 mm is cut from a cured epoxy resin composition obtained in (2). If wet Tg is to be measured, the specimen is soaked in boiling water (98-100° C.) for 24 hours. The specimen is then subjected to measurement of Tg in 1.0 Hz Torsion Mode using a dynamic viscoelasticity measuring device (ARES, manufactured by TA Instruments) by heating it to the temperatures of 50° C. to 250° C. at a rate of 5° C./min in accordance with SACMA SRM 18R-94.

Tg was determined by finding the intersection between the tangent line of the glass region and the tangent line of the transition region from the glass region to the rubber region on the temperature-storage elasticity modulus curve, and the temperature at that intersection was considered to be the glass transition temperature (also called the G' Tg).

(5) Viscosity Measurement Method

In other embodiments of the present invention, the epoxy resin composition may have a certain viscosity at 40° C. In the present invention, "viscosity" refers to the complex viscoelastic modulus.

The viscosity of the epoxy resin composition was measured using a dynamic viscoelasticity measuring device (ARES, manufactured by TA Instruments) using parallel plates with a diameter of 40 mm while increasing the temperature at a rate of 2° C./min, with a strain of 10%, frequency of 0.5 Hz, and plate interval of 1 mm, from 40° C. to 150° C. For the minimum viscosity, the measurement is taken where the viscosity reaches minimum and then starts to increase from the cure. The minimum viscosity is considered good for processing if the viscosity is greater than 2.0 Pa·s (6) Viscosity Increase The viscosity increase of the epoxy resin composition is measured by setting the parameters of a dynamic viscoelasticity measuring device (ARES, manufactured by TA instruments) per the same method for viscosity measurement and holding the desired temperature for a certain amount of time, in this case, 65° C. for 2 hours. The viscosity increase is calculated using the equation below:

$$\text{viscosity increase} = \frac{\eta_{final}}{\eta_{initial}}$$

$\eta_{initial}$ is the initial viscosity of the epoxy resin composition at 65° C.

$\eta_{final}$ is the final viscosity of the epoxy resin composition at 65° C. after 2 hours (7) 3-Point Bending Test In other embodiments of the present invention, the cured epoxy resin composition may have certain flexural properties. Flexural properties were measured in accordance with the following procedure. A specimen measuring 12.5 mm×60 mm was cut from the cured epoxy resin composition obtained in (2). Then, the specimen is processed in a 3-point bend flexural test in accordance with ASTM D7264 using an Instron Universal Testing Machine (manufactured by Instron). The test specimens are tested at room temperature and 121° C. to obtain the RTD (Room Temperature Dry) and the hot/wet flexural properties of the cured epoxy resin composition. The hot/wet resin specimens were soaked for 24 hours at 98° C. before testing.

(8) Thermal Oxidative Weight Loss

In other embodiments of the present invention, the cured epoxy resin composition may have thermal oxidative resistance when soaked for long periods of time at elevated temperatures. The percent weight loss of the cured epoxy resin composition when made into a carbon fiber prepreg with a fiber areal weight of 190 and Rc of 35% wherein a panel is made of 12 plies with dimensions of 300 mm×300 mm was measured after being soaked at 180° C. for 1000H. The percent weight loss of the cured epoxy resin composition is determined by comparing the weight of the panel specimen ($W_{before}$), with the dimensions 2.5 mm×300 mm×300 mm after being cured at 210° C. for 2 hours with the weight ($W_{after}$) of the panel specimen after soaking in a convection oven @ 180° C. for 1000 hours. Herein, the degree of cure can be calculated by the following formula:

$$\text{Thermal Degradation Weight Loss (\%)} = \frac{W_{before} - W_{after}}{W_{before}} \times 100$$

Where: $W_{before}$=Weight of the specimen before thermal degradation $W_{after}$=Weight of the specimen after thermal degradation The various amounts of the components used for each example are stated in Tables 1-2. The epoxy resin compositions shown in Tables 1-2 were produced in accordance with the method described in (1). The properties for the cured epoxy resin compositions reported in Tables 1-2 were achieved using the cure profile described in (2).

In comparison to comparative examples 1-10, the epoxy resin compositions in working examples 1-17 comprising the embodiments of the invention have, when cured, significantly higher resin flexural modulus at 121° C. for hot wet conditions and a higher wet Tg with adequate degree of cure and thermal stability.

In contrast, the comparison examples may not have high wet Tg but have high modulus. The epoxy resin compositions that have high wet Tg do not have high modulus. Other examples may have good Tg and modulus but the viscosity at 40° C. is too high, making the handleability for prepreg based on such epoxy resin compositions poor. Also, if the viscosity is adjusted so that the viscosity at 40° C. is good for handleability, the minimum viscosity is too low. Although comparative example 10 was made, it could not be processed due to the very high resin viscosity; therefore, no data was generated.

TABLE 1

Working Examples

| | | | Unit | Ex 1 | Ex 2 | Ex 3 | Ex 4 | Ex 5 | Ex 6 | Ex 7 | Ex 8 | Ex 9 | Ex 10 | Ex 11 | Ex 12 |
|---|---|---|---|---|---|---|---|---|---|---|---|---|---|---|---|
| Epoxy | Component A | NC-7000L | PHR | | | | 25 | 25 | 35 | 40 | | 40 | 25 | 25 | 15 |
| | | NC-7000H | | | | | | | | | 40 | | | | |
| | | HP-5000L | | 15 | 25 | | | | | | | | | | |
| | | HP-4770 | | | | 30 | | | | | | | | | |
| | Component B | XB 4399-3 | | | | | | | | | | | | | |
| | | EXA-7250 | | 35 | 25 | 20 | 25 | 25 | 15 | 10 | 10 | 10 | 25 | 25 | 30 |
| | Component C | MY 721 | | 50 | | | | | | | | 50 | 10 | 20 | |
| | | MY 0510 | | | 50 | 50 | 50 | 50 | 50 | 50 | 50 | | 40 | 30 | 50 |
| | Other Epoxies | GAN | | | | | | | | | | | | | 5 |
| | | Epon 828 | | | | | | | | | | | | | |
| Curing Agent | Component D | Aradur® 9664-1 | | 47 | 47 | 48 | 48 | 38 | 46 | 45 | 45 | 42 | 46 | 46 | 45 |
| | | Aradur® 9719-1 | | | | | | | | | | | | | |
| Additive | Thermoplastic | Sumika-Excel® 5003P | | | | | | | | | | | | | |
| | | Virantage® VW-10700RFP | | 15 | 15 | 15 | 15 | 15 | 15 | 15 | 15 | 15 | 15 | 15 | 15 |
| | Active Hydrogen: Epoxy group Molar Ratio | | | 1 | 1 | 1 | 1 | 0.8 | 1 | 1 | 1 | 1 | 1 | 1 | 1 |
| Epoxy Resin Properties | Flexural Modulus 121° C. | ETW | GPa | 2.1 | 2.1 | 2.2 | 2.14 | 2.14 | 2.15 | 2.18 | 2.14 | 2.27 | 2.1 | 2.1 | 2.2 |
| | Wet Tg | — | ° C. | 212 | 207 | 237 | 222 | 223 | 218 | 220 | 222 | 225 | 222 | 226 | 220 |
| | Degree of Cure | | % | 96 | 96 | 96 | 95 | 95 | 97 | 98 | 97 | 97 | 96 | 96 | 96 |
| | Viscosity @ 40° C. | | Pa·s | Δ | ○ | ○ | ○ | ○ | ○ | ○ | ○ | Δ | Δ | ○ | ○ |
| | Viscosity at minimum | | Pa·s | Good | Good | Good | Good | Good | Good | Good | Good | Good | Good | Good | Good |
| | Thermal degradation weight loss 1000 h @ 180° C. | | % | 0.9 | 0.7 | 0.9 | 0.8 | 0.9 | 0.9 | 1.0 | 1.0 | 0.8 | 0.8 | 1.0 | 1.0 |

TABLE 2

Working Examples and Comparative Examples

| | | | Unit | Ex 13 | Ex 14 | Ex 15 | Ex 16 | Ex 17 | C.E. 1 | C.E. 2 | C.E. 3 |
|---|---|---|---|---|---|---|---|---|---|---|---|
| Epoxy | Component A | NC-7000L | PHR | 30 | 50 | 40 | 20 | | | | |
| | | NC-7000H | | | | | | | | | |
| | | HP-5000L | | | | | | 35 | | | |
| | | HP-4770 | | | | | 20 | | 30 | 35 | |
| | Component B | XB 4399-3 | | | | | | | | | 50 |
| | | EXA-7250 | | 10 | 10 | 10 | 10 | 15 | | | |
| | | EPPN-501H | | | | | | | | | |
| | Component C | MY 721 | | | | | | | 70 | 40 | 50 |
| | | MY 0510 | | 50 | 40 | 50 | 50 | 60 | | 25 | |
| | Other Epoxies | GAN | | 10 | | | | | | | |
| | | EPON 828 | | | | | | | | | |
| Curing Agent | Component D | Aradur® 9664-1 | | 46 | 36 | 5 | 36 | 45 | 45 | 42 | 41 |
| | | Aradur® 9719-1 | | | | | 41 | | | | |
| Additive | Thermoplastic | Sumika Excel® 5003P | | | | | | | | 10 | |
| | | Virantage® VW-10700RFP | | 15 | 15 | 15 | 15 | 15 | 15 | 15 | 0 |
| Active Hydrogen: Epoxy group Molar Ratio | | | | 1 | 0.8 | 1 | 0.8 | 1 | 1 | 1 | 1 |
| Epoxy Resin Properties | Flexural Modulus | ETW 121° C. | GPa | 2.2 | 2.2 | 2.3 | 2.15 | 1.9 | 2.3 | 2.2 | 1.7 |
| | Wet Tg | — | ° C. | 215 | 215 | 205 | 214 | 207 | 160 | 183 | 260 |
| | Degree of Cure | | % | 96 | 96 | 96 | 97 | 96 | 94 | 96 | 96 |
| | Viscosity @ 40° C. | | | ○ | ○ | ○ | ○ | ○ | ○ | ○ | ○ |
| | Viscosity at minimum | | | Good | Good | Good | Good | Good | Good | Good | Low |
| | Weight loss | | % | 1.0 | 0.8 | 1.0 | 0.8 | 0.6 | 1.5 | 1.4 | 0.5 |

| | | | Unit | C.E. 4 | C.E. 5 | C.E. 6 | C.E. 7 | C.E. 8 | C.E. 9 | C.E. 10 |
|---|---|---|---|---|---|---|---|---|---|---|
| Epoxy | Component A | NC-7000L | PHR | 25 | 50 | | | | 45 | 40 |
| | | NC-7000H | | | | | | | | |
| | | HP-5000L | | | | | | | | |
| | | HP-4770 | | | | | 25 | | | |
| | Component B | XB 4399-3 | | | | | | | | |
| | | EXA-7250 | | | 25 | | | | 5 | 40 |
| | | EPPN-501H | | | | 50 | | 25 | | |
| | Component C | MY 721 | | | | | | | | |
| | | MY 0510 | | | | 50 | 50 | 75 | 75 | 50 | 20 |
| | Other Epoxies | GAN | | | | | | | | |
| | | EPON 828 | | 50 | | | | | | |
| Curing Agent | Component D | Aradur® 9664-1 | | 34.5 | 45.8 | 49.3 | 53.6 | 55.3 | 44.7 | 51.4 |
| | | Aradur® 9719-1 | | | | | | | | |
| Additive | Thermoplastic | Sumika Excel® 5003P | | | | | | | | |
| | | Virantage® VW-10700RFP | | 15 | 15 | 15 | 15 | 15 | 15 | 15 |
| Active Hydrogen: Epoxy group Molar Ratio | | | | 1 | 1 | 1 | 1 | 1 | 1 | 1 |
| Epoxy Resin Properties | Flexural Modulus | ETW 121° C. | GPa | 2.1 | 2.2 | 1.7 | 1.9 | 1.5 | 2.1 | — |
| | Wet Tg | — | ° C. | 191 | 200 | 250 | 188 | 252 | 202 | — |
| | Degree of Cure | | % | 97 | 95 | 96 | 98 | 97 | 97 | — |
| | Viscosity @ 40° C. | | | Δ | Δ | Δ | ○ | ○ | Δ | — |
| | Viscosity at minimum | | | Good | Good | Good | Good | Good | Good | — |
| | Weight loss | | % | 1.5 | 1.5 | 0.8 | 1.4 | 1.6 | 1.0 | — |

○ = viscosity is good for tack
Δ = low tack but good handleability
X = No tack and brittle prepreg

What is claimed is:

1. An epoxy resin composition for a fiber-reinforced composite material comprising component (A), component (B), component (C), and component (D), and at least one thermoplastic resin, wherein the epoxy resin composition when cured has a weight loss of less than 1.0% when thermally soaked at 180° C. for 1000 hours, and wherein:

component (A) comprises at least one poly-naphthalene-based epoxy resin with an epoxy functionality of two as represented in Formula (I):

Formula (I)

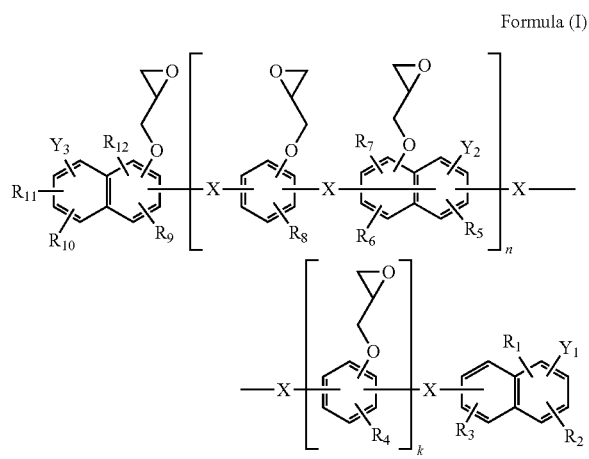

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_3$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0, k is 0 or an integer of 1, wherein the Y groups may be attached to either or both rings of each naphthalene nucleus; and each X is independently selected from the group consisting of a direct bond, —$CH_2$—, —$C(CH_3)_2$—, —S—, —$SO_2$—, —O—, —C(=O)O—, —C(=O)—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X;

component (B) comprises at least one non-linear multi-phenyl epoxy resin in a total amount of from 10 to 35 PHR per 100 PHR of total epoxy resin;

component (C) comprises at least one epoxy resin having an epoxy functionality of at least three which is neither a poly-naphthalene-based epoxy resin nor a non-linear multi-phenyl epoxy resin that includes triglycidyl-p-aminophenol; and component (D) comprises at least one amine curing agent.

2. The epoxy resin composition according to claim 1, wherein component (B) comprises at least one non-linear multi-phenyl epoxy resin selected from the group consisting of tris and higher (hydroxyphenyl) methane-based epoxy resins, tetra(hydroxyphenyl) ethane-based epoxy resins, fluorene-based epoxy resins, oligomers thereof, and combinations thereof.

3. The epoxy resin composition according to claim 1, wherein component (D) comprises at least one aromatic polyamine curing agent.

4. The epoxy resin composition according to claim 1, wherein component (D) comprises at least one diaminodiphenyl sulfone.

5. The epoxy resin composition according to claim 1, wherein component (A) comprises 15 to 50 PHR in total per 100 PHR of total epoxy resin.

6. The epoxy resin composition according to claim 1, wherein component (C) comprises 30 to 50 PHR in total per 100 PHR of total epoxy resin.

7. The epoxy resin composition according to claim 1, wherein component (D) is present in an amount and component (A), component (B), and component (C) are present in a total amount effective to provide a molar ratio of active hydrogens to epoxy groups ranging from 0.8:1 to 1:1.

8. The epoxy resin composition according to claim 1, wherein the epoxy resin composition when cured has a hot/wet flexural modulus of 1.9 GPa or greater when tested at 121° C.

9. The epoxy resin composition according to claim 1, wherein the epoxy resin composition when cured has a hot/wet flexural modulus of 2.0 GPa or greater when tested at 121° C.

10. The epoxy resin composition according to claim 1, wherein the epoxy resin composition when cured has a hot/wet flexural modulus of 2.1 GPa or greater when tested at 121° C.

11. The epoxy resin composition according to claim 1, wherein the epoxy resin composition when cured has a wet Tg of greater than 200° C.

12. The epoxy resin composition of claim 1, wherein the epoxy resin composition has a viscosity increase less than 2 times the starting viscosity when held at 65° C. for 2 hours.

13. The epoxy resin composition according to claim 1, wherein the at least one thermoplastic resin comprises at least one polyethersulfone.

14. The epoxy resin composition according to claim 13, comprising at least 10 PHR of polyethersulfone.

15. The epoxy resin composition according to claim 13, wherein the epoxy resin composition has a viscosity at 40° C. between $1\times10^3$ Pa*s and $3\times10^4$ Pa*s and a minimum viscosity greater than 1 Pa*s.

16. A prepreg, comprising a reinforcing fiber matrix impregnated with an epoxy resin composition in accordance with claim 1.

17. A fiber-reinforced composite material, obtained by curing a prepreg in accordance with claim 16.

18. A method of making a fiber-reinforced composite material, comprising curing a prepreg in accordance with claim 16 at a temperature of from 170° C. to 230° C.

19. A fiber-reinforced composite material, comprising a cured epoxy resin product obtained by curing a mixture comprised of an epoxy resin composition in accordance with claim 1 and a reinforcing fiber.

20. The epoxy resin composition of claim 1, wherein component (A) comprises 25 to 50 PHR in total per 100 PHR of total epoxy resin.

21. The epoxy resin composition of claim 20, wherein component (C) comprises 30 to 80 PHR per 100 PHR of total epoxy resin.

22. The epoxy resin composition of claim 1, wherein thermoplastic resin comprises 5 to 30 PHR per 100 PHR of total epoxy resin.

23. The epoxy resin composition of claim 22, wherein thermoplastic resin comprises 15 to 30 PHR per 100 PHR of total epoxy resin.

* * * * *